Nov. 13, 1951 C. J. GAREIS 2,574,636
BREAD DOUGH FINISHING MACHINE
Filed Aug. 1, 1947 6 Sheets-Sheet 1
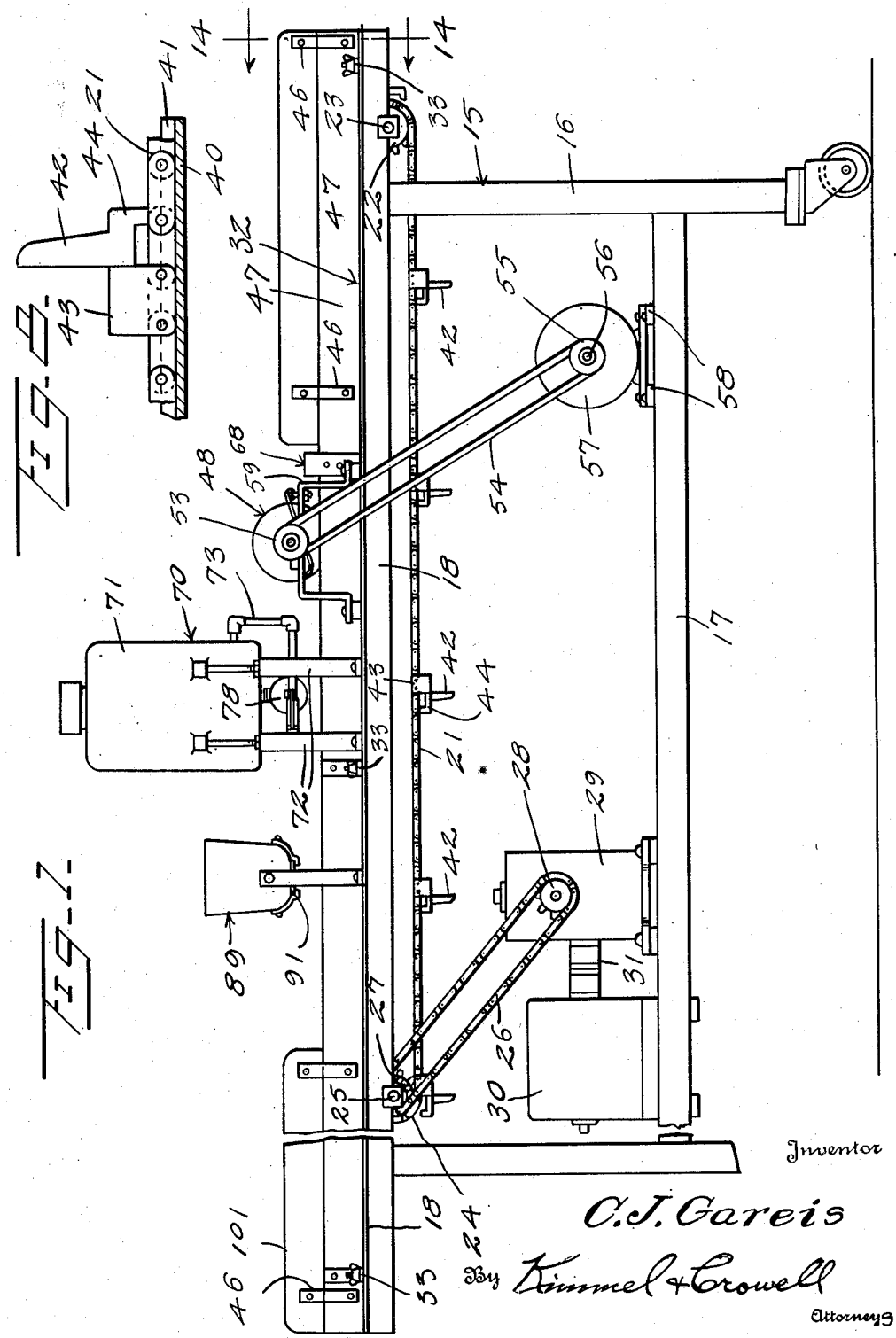
Inventor
C. J. Gareis
By Kimmel & Crowell
Attorneys

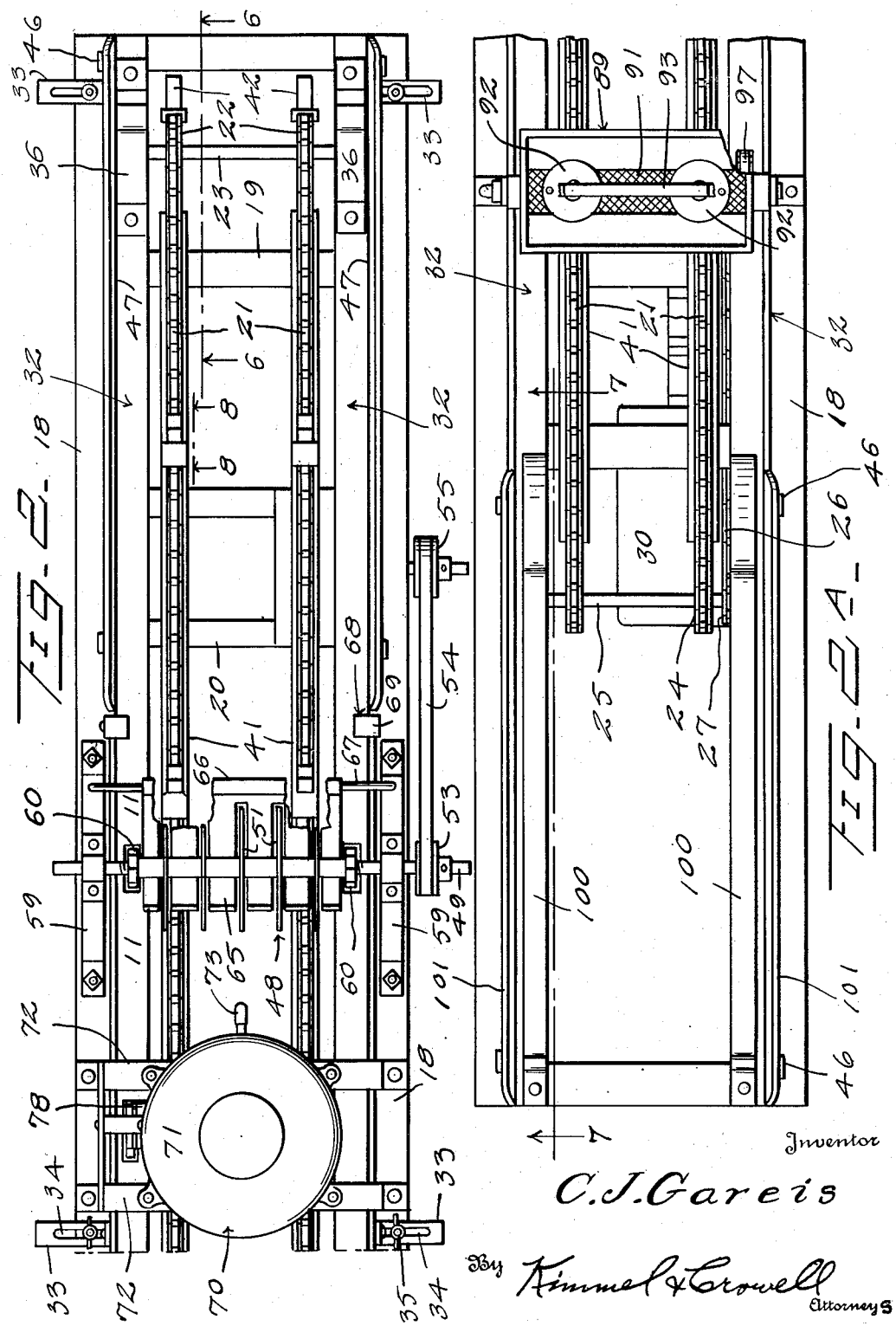

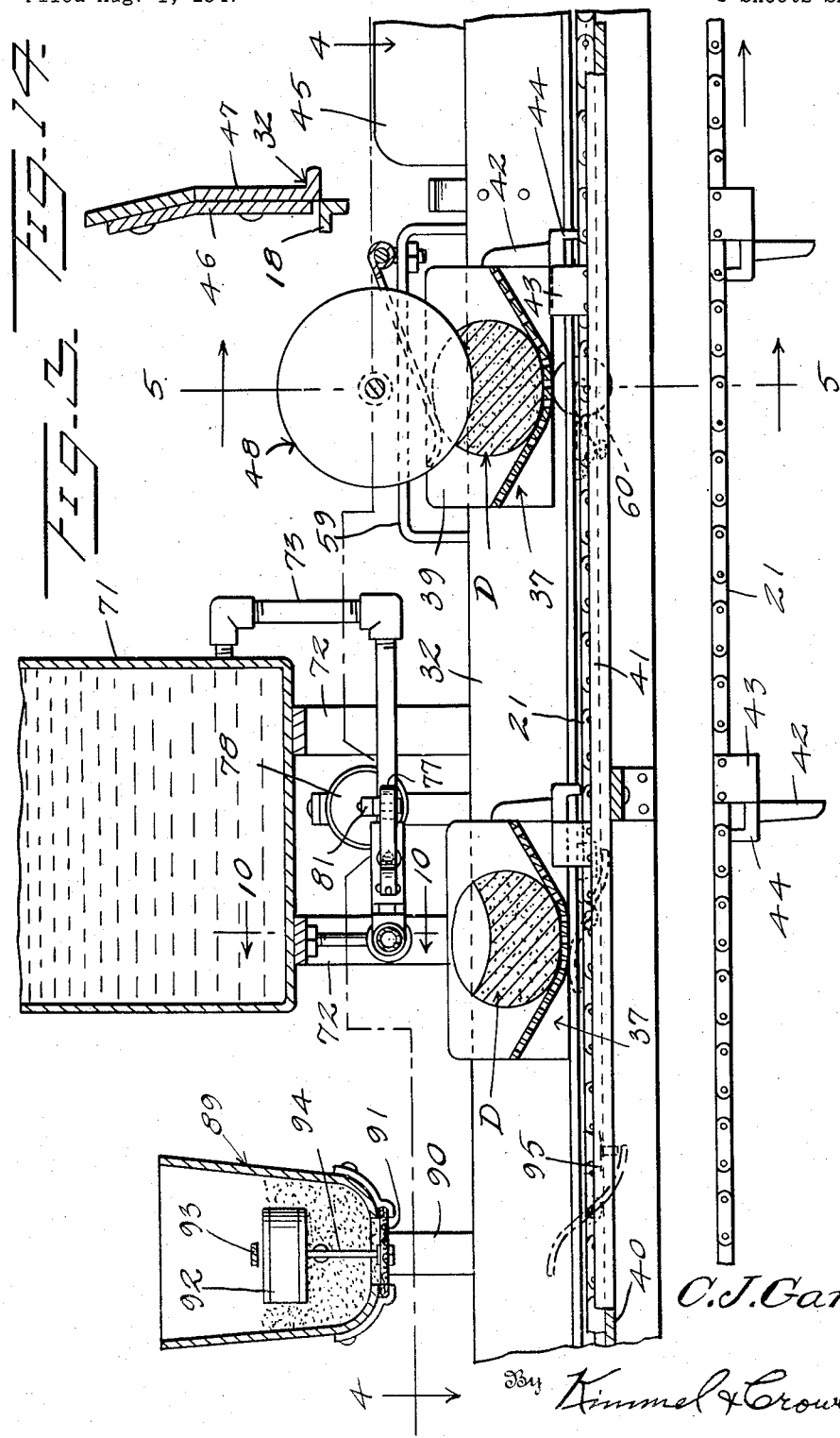

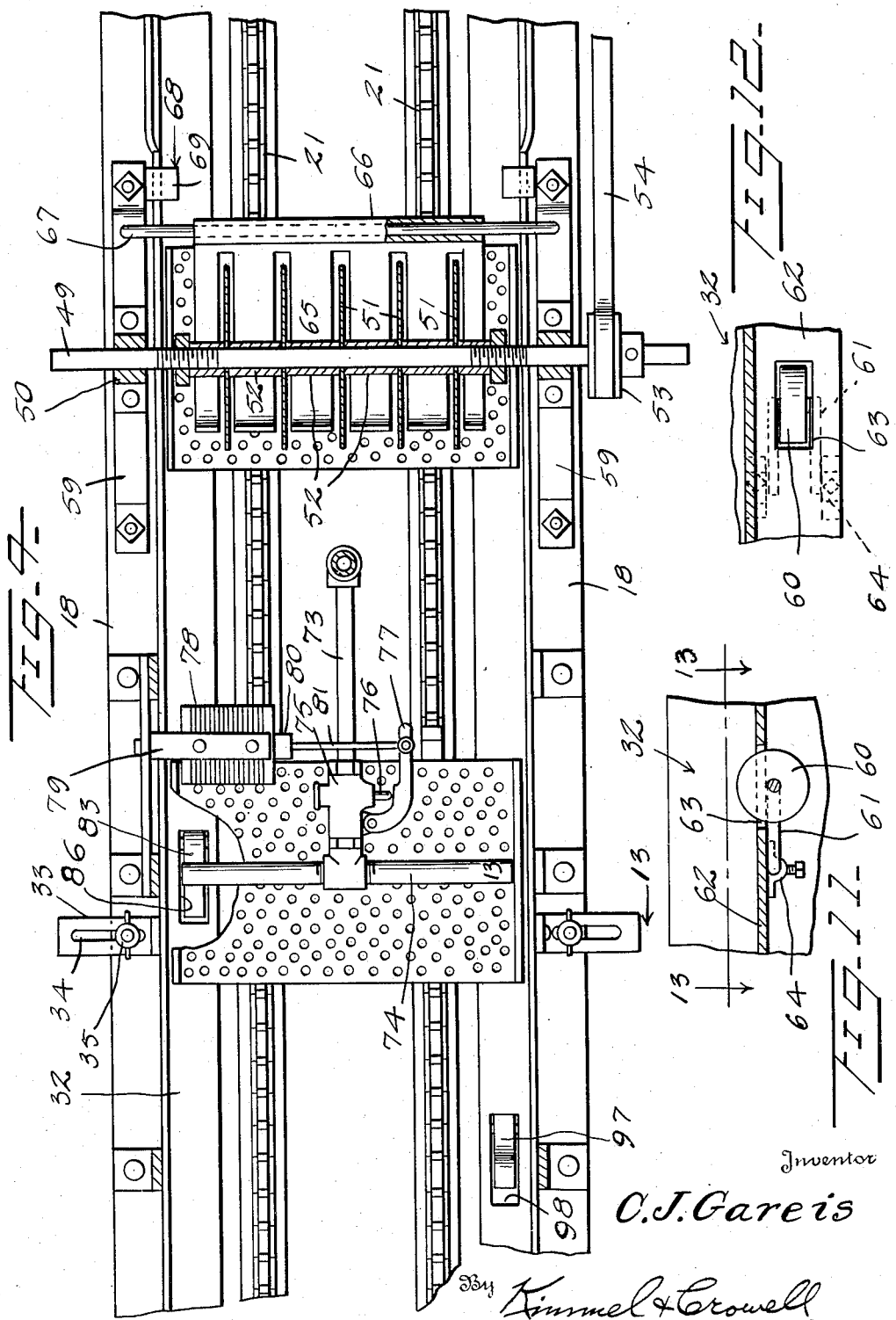

Nov. 13, 1951          C. J. GAREIS          2,574,636
BREAD DOUGH FINISHING MACHINE
Filed Aug. 1, 1947          6 Sheets—Sheet 5
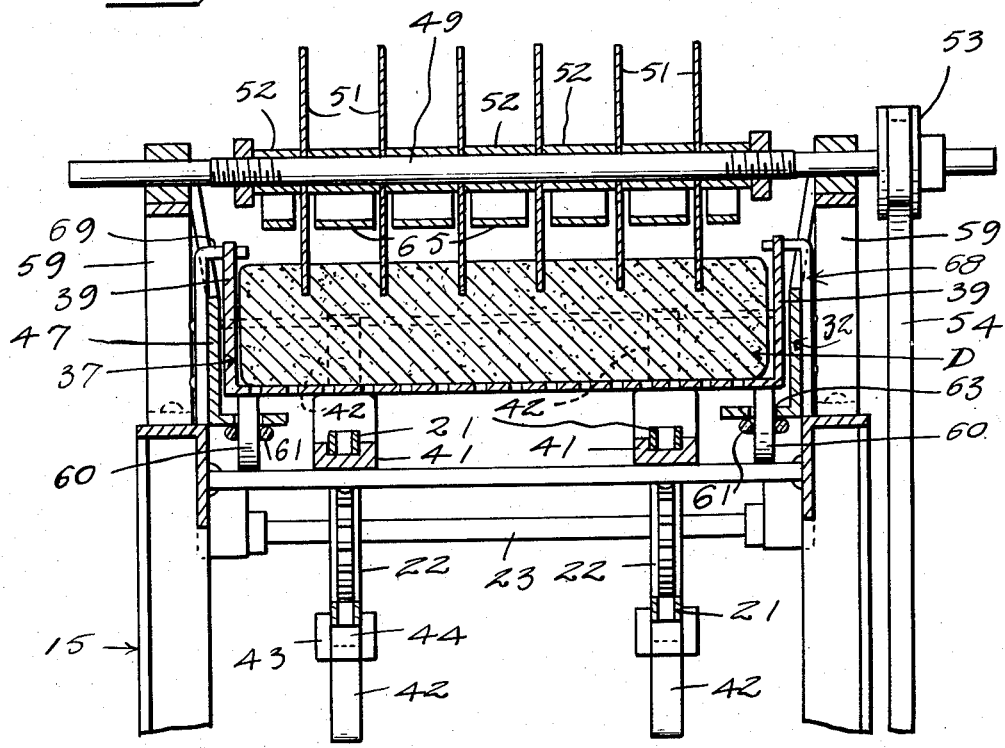
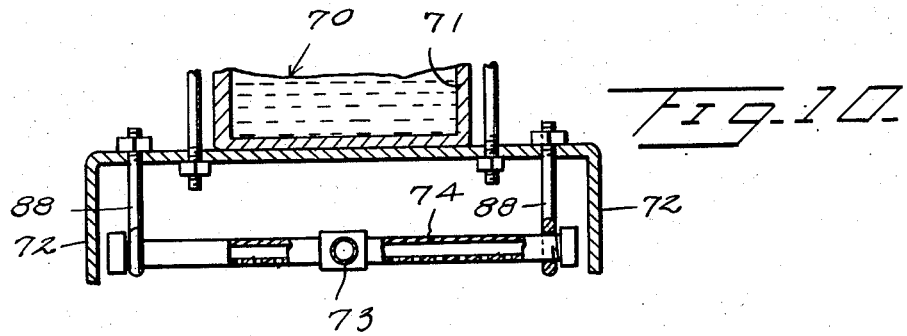
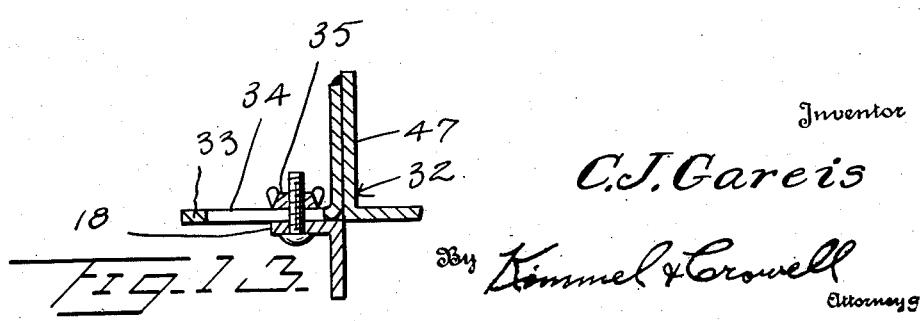

Nov. 13, 1951     C. J. GAREIS     2,574,636
BREAD DOUGH FINISHING MACHINE
Filed Aug. 1, 1947                           6 Sheets-Sheet 6
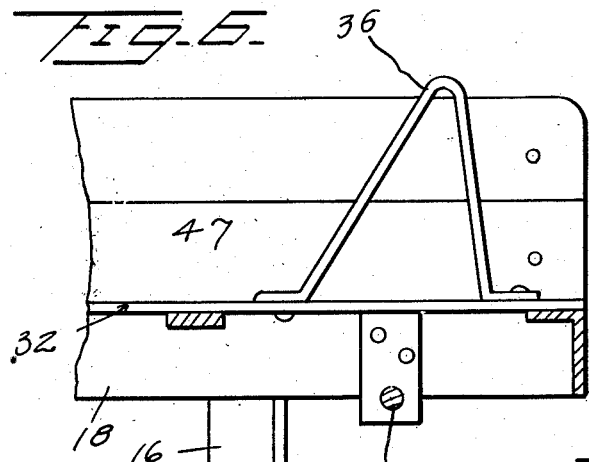
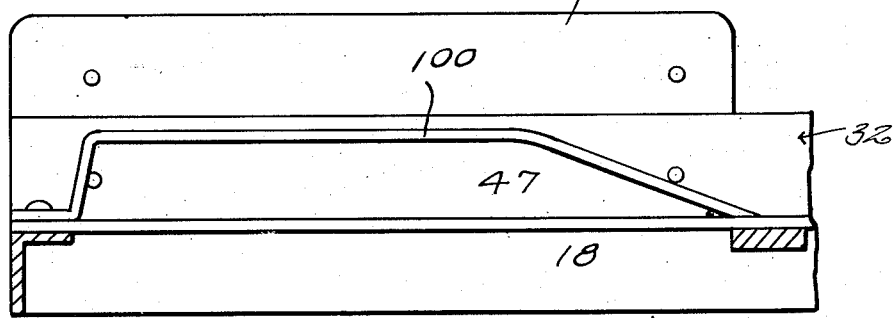
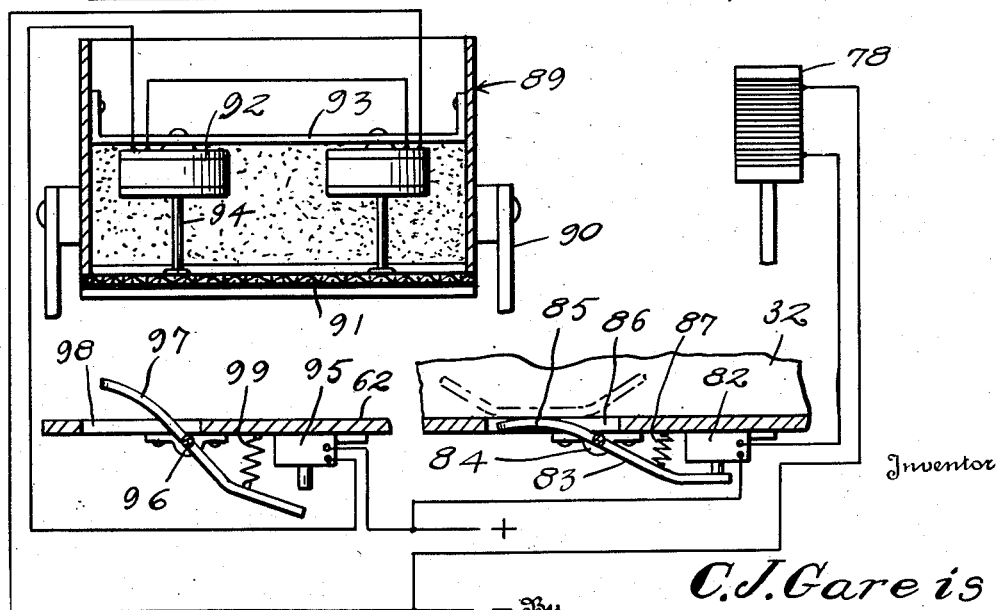

Patented Nov. 13, 1951

2,574,636

UNITED STATES PATENT OFFICE 2,574,636

BREAD DOUGH FINISHING MACHINE

Clarence J. Gareis, Forty Fort, Pa., assignor of fifty per cent to United Bakers, Inc., Forty Fort, Pa., a corporation of Pennsylvania Application August 1, 1947, Serial No. 765,559

5 Claims. (Cl. 107—22)

1

This invention relates to a bread dough finishing machine.

In the treatment of dough for rye or Vienna breads, the molded dough is slitted, sprinkled or washed with water to give the bread a glossy appearance, and the dough is then sprinkled with seed, such as caraway seed or the like. The present invention relates to a machine which in one pass of the dough will perform all of these operations which have heretofore been performed by hand, so that the panned dough will be immediately ready for the oven.

Another object of this invention is to provide a finishing machine of this kind wherein the water and seed sprinkling devices are normally inoperative, but are momentarily operated when a pan of dough is therebeneath.

A further object of this invention is to provide a machine of this kind wherein the depth of the slits or cuts in the dough can be adjusted to the desired degree.

A further object of this invention is to provide a slitting or cutting means which will slit or cut the bread uniformly.

With the above and other objects in view, my invention consists in the arrangement, combination and details of construction disclosed in the drawings and specification, and then more particularly pointed out in the appended claims.

In the drawings,

Figure 1 is a detail side elevation, partly broken away, of a bread dough finishing machine constructed according to an embodiment of this invention.

Figure 2 is a plan view of a portion of the machine,

Figure 2A is a plan view of the remaining portion of the machine, extending from the left end of Figure 2, Figure 3 is a fragmentary enlarged longitudinal section of the device, Figure 4 is a sectional view taken on the line 4—4 of Figure 3, Figure 5 is a sectional view taken on the line 5—5 of Figure 3, Figure 6 is a fragmentary sectional view taken on the line 6—6 of Figure 2, Figure 7 is a fragmentary sectional view taken on the line 7—7 of Figure 2A, Figure 8 is a fragmentary sectional view taken on the line 8—8 of Figure 2, Figure 9 is a diagrammatic view, partly in section, showing the electric circuits embodied in this invention, Figure 10 is a fragmentary sectional view taken on the line 10—10 of Figure 3, Figure 11 is a fragmentary sectional view taken substantially on the line 11—11 of Figure 2, Figure 12 is a sectional view taken on the line 12—12 of Figure 11,

2

Figure 13 is a sectional view taken on the line 13—13 of Figure 4; and

Figure 14 is a sectional view taken on the line 14—14 of Figure 1.

Referring to the drawings, the numeral 15 designates generally a frame which is formed of upright legs 16 connected together by longitudinal supporting bars 17 and having mounted on their upper ends longitudinal angle bars 18. The angle bars 18, as shown in Figure 2, are adapted to be connected together by means of upper connecting bars 19, and the lower connecting bars 17 are connected together by lower connecting bars 20.

An endless conveyor which is formed of a pair of endless chains 21 is disposed between the upper bars 18 and the chains 21 are trained over idler sprockets 22 secured to the shaft 23 at the intake or leading end of the machine. The chains 21 are also trained over sprockets 24 secured to a shaft 25, and a driving chain 26 trained over a sprocket 27 fixed to the shaft 25 provides the medium for moving the chains 21. The driving chain 26 is trained over a driving sprocket 28 operatively connected with a speed reducing unit 29 which is connected to a motor 30 through a driving connection 31. The motor 30 and speed reducing units 29 are supported between the lower connecting or supporting bars 17.

The frame 15 has mounted on the upper bars 18 a pair of longitudinally extending guide members 32 which are angle-shaped in cross section, with one side vertical and the other side extending inwardly. The guide bars or members 32 have secured thereto on the outer side thereof right angle adjusting bars 33 having a lower horizontal side engaging the upper horizontal side of the upper frame member 18 and provided with an elongated slot 34 through which an adjusting bolt 35 engages. In this manner the guide members 32 may be adjusted inwardly or outwardly to provide for movably supporting bread pans in operative position with respect to the conveyor chains 21.

At the receiving end of the machine the guide members 32 have secured thereto V-shaped bars 36 which are adapted to initially support the pans at the receiving or intake end of the machine prior to the engagement of the conveyor fingers or lugs with the pans. The dough D which is formed as an elongated element of predetermined thickness and length is disposed in a pan 37. The pan 37 is formed with a truncated V-shaped bottom 38 which is perforated and the bottom 38 is secured to end plates 39. Transverse members 40 support channeled chain guides 41.

Each chain 21 also has secured thereto upstanding lugs or fingers 42 which are carried by blocks 43 and secured thereto in any suitable manner, blocks 43 being fixed to the chain 21 and forming at least one link in the chain. Each lug or finger 42 is also formed with a steadying finger 44 extending downwardly and engageable with a trailing link, as clearly shown in Figure 8. The finger 42 of each chain is adapted to engage the rear edge of a pan 37 on the upper run of the conveyor for pushing the pan forwardly along the guide members 32.

The guide members 32 at the intake or receiving ends thereof are provided with upwardly extending extensions 45 secured by supporting bars 46 to the outer vertical side 47 of a guide member 32. A cutting or slitting means generally designated as 48 extends transversely across the guide members 32 and comprises a shaft 49 journaled in bearings 50 carried by inverted U-shaped supporting bars 59.

The shaft 49 has mounted thereon a plurality of spaced apart cutting discs 51 held in spaced apart relation on the shaft 49 by spacer sleeves 52. The shaft 49 has mounted on one end thereof a pulley 53 about which a belt 54 is trained, and the belt 54 is also trained about a driving pulley 55 secured to a motor shaft 56 operated by a motor 57. The motor 57 is supported on transverse supporting bars 58 fixed to the lower connecting bars 17 and disposed at the end of the machine opposite from the motor 30.

The pans 37 are of such height that they may initially pass beneath the cutting blades 51 and are adapted to be elevated when disposed directly beneath the cutting discs 51 by means of elevating rollers 60 which, as shown in Figures 11 and 12, are carried by a U-shaped roller support 61, being advanced by fingers 42. The horizontal inwardly projecting sides 62 of each guide 32 are formed with an opening or slot 63 through which the roller 60 is adapted to project for engagement with a passing tray or pan. The U-shaped support 61 for each roller 60 is adjustably carried by a bearing 64 fixed to the lower side of the horizontal side 62 of the guide 32. Set screws extending through bearings 64 are provided to engage supports 61 to hold the latter in the desired position. In this manner the roller 60 may be vertically adjusted so as to elevate the tray or pan to the desired degree and provide for slitting of the dough at the time the pan is beneath the cutting means 48.

At the time the dough is being slit or cut by the cutters 51 the dough is held by means of a plurality of resilient fingers 65 which are carried by a barrel 66 mounted on a supporting bar or shaft 67. The bar or shaft 67 extends across the bight or upper side of the inverted U-shaped bearing supports 59.

In order to prevent the trays from tilting backwards at the time the trays initially engage the rollers 60, I have provided equalizing or holding bars 68 including an inwardly projecting finger 69 which extends over the upper edge of the vertical side of each guide member 32. The engagement of lugs 69 with these upper edges holds the forward edges of the tray downwardly in proper relation to the cutting apparatus. After the pan passes the cutting or slitting means 48 it is moved forwardly to a sprinkler where water is sprinkled or sprayed onto the dough. The sprinkler which is generally designated as 70 includes a tank 71 supported by a pair of inverted U-shaped supporting bars 72 which are fixed to the upper frame bars 18.

The tank 71 has extending downwardly therefrom a pipe 73 which is connected to a transverse perforated pipe 74. The pipe 73 has interposed therein a valve 75 which is spring-pressed to a closed position and includes a stem 76. A lever 77 is carried by the valve 75 in a position for engagement with the stem 76 so that rocking of the lever 77 inwardly toward the valve 75 will move the stem 76 inwardly and open the valve.

The lever 77 is connected to a solenoid 78 supported by a supporting bar 79 and the core 80 of the solenoid is connected to the lever 77 by means of a connecting link 81. The solenoid 78 is normally de-energized, but is adapted to be energized when a pan is directly beneath the sprinkler pipe 74, by closing of a switch 82 which is fixed beneath the guide 32. The switch 82 is closed by means of a rock lever 83 pivotally secured as at 84 to the guide 32 and connected to the winding of the solenoid 78 and a source of electric current in the manner illustrated in Figure 9. The lever 83 is pivoted between the ends thereof and has a longitudinally curved upper end 85 adapted to project through an opening 86 formed in the horizontal side 62 of one of the guides 32. The lever 83 is spring-pressed downwardly at its lower end by means of a spring 87 so that the switch 82 which is also spring-pressed to a circuit breaking position will normally be open.

The sprinkler pipe 74 is suspended from the forward tank supporting bar 72 by means of a pair of eye bolts 88 which may be vertically adjusted to provide for the necessary spray action on the dough as it is disposed beneath and moves under the sprinkler pipe 74. After the dough in the pan has been sprinkled with water and passes forwardly from the wetting zone the dough will pass beneath a seed hopper 89. The hopper 89 is supported by means of upright supporting bars 90 fixed to the frame bars 18, and the hopper 89 includes a screen or perforate bottom wall 91.

The hopper 89 is adapted to have selected seed positioned therein such as caraway seed, poppy seed or sesame seed.

The screen or perforate bottom wall 91 is adapted to be vibrated at the time a pan of dough is positioned therebeneath. The vibrating or shaking of the bottom wall 91 is effected by means of a pair of electric vibrators 92 of any desired conventional type which includes a reciprocating element for imparting vibratory movement to an associated structure, and which are secured to supporting bars 93 fixed transversely across the hopper 89. The vibrators 92 include a rod 94 extending downwardly and fixed at its lower end to the screen or perforate wall 91. The vibrators 92 are adapted to be energized only when a pan of dough is positioned therebeneath.

A switch 95 is fixed beneath one of the guide members 32, the switch 95 being spring-pressed to a circuit breaking position and similar to switch 82 and similarly connected in parallel to a source of electric current as shown in Figure 9. A switch operating lever 96 is pivotally mounted beneath the guide 32 having an upper longitudinally curved end 97 projecting through a slot 98 formed in the horizontal side 62 of the rail 32. The lever 96 is constantly urged downwardly at its lower end out of engagement with the switch 95 by means of a spring 99.

After the pan of dough passes beneath the seeder it moves forwardly to the discharge end of the machine and the pan of dough is disengaged from the moving fingers 42 by means of elevating rails 100 which is fixed to the inside of each guide 32. An upwardly extending plate 101 is also fixed to the guide 32 adjacent the elevating rails 100 so that several pans of dough may rest on the elevating rails 100 before being manually removed for placement in the oven.

In the use and operation of this machine, the motors 30 and 57 are continuously operated so that the conveyor chains 21 will continuously move along the length of the frame and the cutters 51 will be continuously driven. The pans 37 containing a formed dough loaf are placed at the right end of the machine, as viewed in Figure 1. As each pair of pan moving fingers 42 move to the upper run of the conveyor chains one pan will be engaged by adjacent fingers of each chain 21 and that pan will be moved forwardly to the cutting or slitting knives 51. As the pan 37 moves beneath the knives 51, the pan is elevated by each roller 60 carried by the guides 32. The pan then drops down from the elevating rollers and moves forwardly to the sprinkling zone.

When the pan is directly beneath the sprinkler pipe 74 the switch 82 will be closed so that solenoid 78 will open valve 75 and permit water from tank 71 to gravitatingly flow through the sprinkler 74. The valve 75 is held in open position for only sufficient time to sprinkle the dough in the pan directly beneath the sprinkler. After the pan passes the sprinkling zone it moves forwardly to the seeding zone and when the pan is beneath the seed hopper 89, lever 97 will be depressed and switch 95 closed so that the vibrators 72 will vibrate the screen 91 and discharge a quantity of seed on the now wetted dough. The dough then passes from the seeding zone to the discharge end of the machine and the pan is released from the moving finger 42 by the elevating rails 100, which raise the pan to a degree sufficient to permit the fingers 42 to pass therebeneath and about sprockets 27 to the return flight of the chains. The pan will remain on the elevating rails 100 until manually removed and this rail may be of a sufficient length to provide for supporting a number of pans.

I do not mean to confine myself to the exact details of construction herein disclosed, but claim all variations falling within the purview of the appended claims.

What I claim is:

1. A bread dough finishing machine comprising a frame, a horizontally movable conveyor carried by said frame, pan guide means carried by said frame, upwardly extending pan engaging fingers carried by said conveyor for moving a pan along said guide means, a slicing element carried by said frame above said conveyor, means continuously operating said element, and roller means carried by said frame and adapted to raise the pan when the latter is disposed below said slicing element for engagement between said element and the dough in the pan, said roller means being adapted to lower said pan before passing said slicing element to prevent cutting of said pan.

2. A bread dough finishing machine comprising a frame, a horizontally movable conveyor carried by said frame including a pair of transversely spaced apart continuous chains, pan engaging fingers extending upwardly from said conveyor chains for moving pans with bread therein along the length of said frame, a dough slitting element carried by said frame above said conveyor, means for continuously operating said element, a transversely extending roller disposed between said spaced apart conveyor chains and below said element, means carried by said frame for adjusting the vertical position of said roller relative to said chains whereby, when said roller is disposed above the surface of said conveyor, it will be effective to raise the pans towards the slitting element as the pans pass therebeneath.

3. A bread dough finishing machine comprising a frame, a horizontally movable conveyor carried by said frame, pan engaging fingers carried by said conveyor for moving a pan along said frame, a slitting element carried by said frame above said conveyor, said element including a rotatable shaft having a plurality of spaced apart cutting discs thereon, means for rotating said slitting element, roller means carried by said frame below said slitting element and extending above said conveyor for raising the pan when the latter is disposed below said slitting element, and a dough holding member carried by said frame including a plurality of resilient fingers extending between said cutting discs for engagement with the dough during the slitting operation.

4. A bread dough finishing machine comprising a frame, a horizontally movable conveyor carried by said frame including a pair of transversely spaced apart continuous chains, pan engaging fingers extending upwardly from said conveyor chains for moving pans with dough therein along the length of said frame, a dough slitting element carried by said frame above said conveyor, means for continuously operating said element, a transversely extending roller disposed between said spaced apart conveyor chains and below said element, means carried by said frame for adjusting the vertical position of said roller relative to said chains whereby, when said roller is disposed above the surface of said conveyor, it will be effective to raise the pans towards the slitting element as the pans pass therebeneath, an equalizing bar, and an inwardly extending finger thereon engageable with said tray to preclude tilting of said tray when passing over said roller.

5. A bread dough finishing machine comprising a frame, a horizontally movable conveyor carried by said frame including a pair of transversely spaced apart continuous chains, pan engaging fingers extending upwardly from said conveyor chains for moving pans with dough therein along the length of said frame, a dough slitting element carried by said frame above said conveyor, means for continuously operating said element, a transversely extending roller disposed between said spaced apart conveyor chains and below said element, means carried by said frame for adjusting the vertical position of said roller relative to said chains whereby, when said roller is disposed above the surface of said conveyor, it will be effective to raise the pans towards the slitting element as the pans pass therebeneath, said last mentioned means comprising a U-shaped roller supporting bracket pivotally secured to said frame and means for securing said bracket in adjusted position.

CLARENCE J. GAREIS.

REFERENCES CITED

The following references are of record in the file of this patent:

UNITED STATES PATENTS

| Number | Name | Date |
|---|---|---|
| 358,358 | King et al. | Feb. 22, 1887 |
| 784,202 | Berg et al. | Mar. 7, 1905 |
| 1,357,476 | Rogers et al. | Nov. 2, 1920 |
| 1,423,014 | Perizzi | July 18, 1922 |
| 1,531,000 | Goodwin | Mar. 24, 1925 |
| 1,565,887 | Andrus | Dec. 15, 1925 |
| 1,908,539 | Quick | May 9, 1933 |
| 2,405,879 | Fredricksen | Aug. 13, 1946 |